United States Patent
Maki et al.

(10) Patent No.: US 7,985,140 B2
(45) Date of Patent: Jul. 26, 2011

(54) ZERO-LASH OLDHAM COUPLING

(75) Inventors: Cliff Maki, New Hudson, MI (US); Alvin Henry Berger, Brownstown, MI (US)

(73) Assignee: Ford Global Technologies, Dearborn, MI (US)

( * ) Notice: Subject to any disclaimer, the term of this patent is extended or adjusted under 35 U.S.C. 154(b) by 390 days.

(21) Appl. No.: 12/244,993

(22) Filed: Oct. 3, 2008

(65) Prior Publication Data
US 2010/0087260 A1 Apr. 8, 2010

(51) Int. Cl.
*F16D 3/04* (2006.01)
(52) U.S. Cl. .......... 464/105; 464/138; 29/888
(58) Field of Classification Search .......... 464/102, 464/104, 105, 137, 138; 29/888; 92/48; 417/470, 471
See application file for complete search history.

(56) References Cited

U.S. PATENT DOCUMENTS

| | | | | |
|---|---|---|---|---|
| 779,928 | A | * | 1/1905 | Halle .......... 464/138 X |
| 1,244,533 | A | * | 10/1917 | Morse .......... 464/103 |
| 1,650,557 | A | | 11/1927 | Weingartner |
| 1,814,836 | A | * | 7/1931 | Lederman .......... 464/105 |
| 1,887,081 | A | * | 11/1932 | Buettell .......... 464/105 |
| 2,488,769 | A | | 11/1949 | Engstrom |
| 2,621,594 | A | * | 12/1952 | Katcher .......... 417/470 X |
| 3,063,264 | A | * | 11/1962 | Forrest .......... 464/105 |
| 3,429,304 | A | | 2/1969 | Wiseman et al. |
| 3,728,995 | A | | 4/1973 | Schramm |
| 3,986,487 | A | | 10/1976 | Yanai |
| 4,480,600 | A | | 11/1984 | Gill |
| 4,591,350 | A | * | 5/1986 | Obermeier .......... 464/138 |
| 6,027,321 | A | | 2/2000 | Shim et al. |
| 6,439,867 | B1 | | 8/2002 | Clendenin |
| 6,976,476 | B1 | | 12/2005 | Mantri |
| 2004/0016414 | A1 | | 1/2004 | Asari et al. |
| 2007/0019990 | A1 | | 1/2007 | Murofushi |

FOREIGN PATENT DOCUMENTS

| | | |
|---|---|---|
| EP | 0369155 A1 | 5/1990 |
| JP | 2195023 A | 8/1990 |
| JP | 2007032444 A | 2/2007 |
| JP | 2007285356 A | 11/2007 |

* cited by examiner

*Primary Examiner* — Greg Binda
(74) *Attorney, Agent, or Firm* — Jerome R. Drouillard; Julia Voutyras (57) ABSTRACT

An Oldham-style coupling assembly wherein a driving shaft (12) is rotatably coupled to a driven shaft (32) using a reduced-lash flexible coupling assembly. The coupling assembly includes an intermediate coupling plate (38) stationed between the driven (32) and driving (12) shafts. A driven lug (34) associated with the driven shaft (32) has tapered contact faces (36) and engages a driving slot (40) in the center of the coupling plate (38). Likewise, a pair of diametrically opposed half-lugs (18) associated with the driving shaft (12) engage in respective half slots (42) through a similar tapered interface. Springs (28) backing each of the half lugs (18) establish a continuous axial compression force within the coupling plate (38) to urge seating of the tapered interfaces but without frustrating transverse sliding in the respective slots (40, 42), thereby taking up lash from the system. The lugs (18, 34) are oriented perpendicular relative to each other, so as to simulate a traditional Oldham-style coupling. The coupling assembly is useful to rotatably unite a fuel pump (14) and a vacuum pump (10) in a vehicular engine.

13 Claims, 8 Drawing Sheets

ZERO-LASH OLDHAM COUPLING

CROSS REFERENCE TO RELATED APPLICATIONS

None.

BACKGROUND OF THE INVENTION

1. Field of the Invention

This invention relates to a coupling assembly for transmitting rotational motion between a driving shaft and a driven shaft, and more particularly toward an Oldham-style coupling with reduced lash.

2. Related Art

Figure 7:
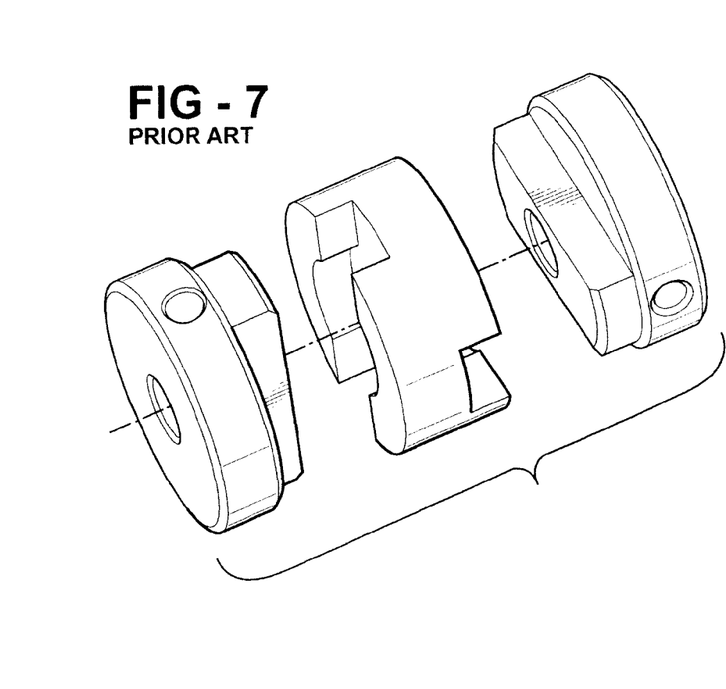
FIG. 7 is an exploded view of a traditional Oldham-style coupling.

In various power transmission configurations, rotating shafts are coupled to each other with a coupling joint to accommodate small amounts of shaft misalignment from collinearity. Such coupling devices have been proposed in a variety of configurations. One design of fairly ancient origin is the Oldham coupling, as shown in FIG. 7, wherein a center torsion block is provided with diametric slots on opposite faces that are oriented perpendicular to each other. Sliding of the center block permits a substantial amount of lateral shaft offset, while built-in clearance permits some angular misalignment as well.

A particular concern with such couplings can arise in certain applications where lash, i.e., clearance or play between contact faces, is undesirable. For example, vacuum pumps are used in some vehicular applications to assist operation of the brake system. For safety reasons, these vacuum pumps are not allowed to be driven from the front end accessory drive (FEAD) belt, and therefore are commonly driven from a timing chain, belt or gear from the cam shaft or other convenient power shaft. When driven from a cam shaft gear or timing gear, as an example, torsional vibrations inherent in the subsystem can introduce unwanted noise, vibration and harshness (NVH), as well as component wear.

The source of backlash in prior art style Oldham couplings (FIG. 7) is found at the interfaces between the drive lugs and the coupling plate slots. Because a slip fit condition is required to achieve proper sliding function and accommodate axial misalignment, lash necessarily exists in the prior art systems. Accordingly, there is a need to couple two rotary members having respective driving and driven shafts in close proximity while accommodating modest shaft misalignment, without introducing unwanted NVH or wear into the mechanical system. The terms "driving" and "driven" refer to the direction of power flow. A driving feature transmits torque to a driven feature in the same hand of rotation as the direction of rotation, whereas a driven member transmits torque to the driving member in a hand of rotation opposite to the direction of rotation.

SUMMARY OF THE INVENTION

An Oldham-style coupling assembly is provided for transmitting rotational motion between two rotary shafts while accommodating modest axis misalignment therebetween. The coupling assembly comprises a driving shaft supported for rotation about a first axis. The driving shaft includes a driving lug having opposed contact faces disposed generally transverse to the first axis. These contact faces are tapered in a converging axial direction away from the driving shaft. A driven shaft is supported for rotation about a second axis generally collinear with the first axis. The driven shaft includes a driven lug located in the same plane as the driving lug, but orthogonally oriented to the driving lug. The driven lug has opposed contact faces disposed generally transverse to the second axis and tapered in a converging axial direction away from the driven shaft. A coupling plate is operatively disposed between the driving and driven shafts. The coupling plate includes a driving slot having tapered side walls corresponding to the contact faces of the driven lug for engaging the driven lug while enabling transverse relative sliding motion therebetween. Similarly, the coupling plate includes a driven slot having tapered side walls corresponding to the contact faces of the driving lug for engaging the driving lug while enabling transverse relative sliding motion therebetween. A biasing element is configured to establish a continuous axial compressive force between each of the driven and driving lugs and the coupling plate.

By forming the driven and driving lugs and their mating driving and driven slots with tapers that converge toward the intermediate coupling plate, a compressive axial force introduced by the biasing element urges both sets of lugs into tighter wedging engagement with the coupling plate, thereby eliminating lash between the components. Thus, two rotary shafts can be coupled for transmitting rotational movement therebetween while accommodating modest shaft misalignment but eliminating or substantially reducing any lash in the coupling assembly.

According to another aspect of this invention, a method is provided for coupling two rotary members having respective driven and driving shafts in close proximity while accommodating modest shaft misalignment therebetween. The method comprises the steps of rotatably supporting a driving shaft about a first axis and providing a driving lug on the driving shaft having tapered contact faces. Furthermore, a driven shaft is rotatably supported about a second axis. A driven lug is provided on the driven shaft having tapered contact faces. An intermediate coupling plate is provided between the driving and driven shafts having a driving slot with tapered side walls corresponding to the contact faces of the driven lug and a driven slot oriented transversely to the driving slot. The driven slot has tapered side walls corresponding to the contact faces of the driving lug. The driven and driving lugs are slidably engaged in their respective driving and driven slots. An axial compression is maintained between the driven and driving lugs and the intermediate coupling plate. As described above, the axial compression drives each tapered lug into tighter engagement with its respective slot, while still permitting relative sliding movement so that the Oldham-style coupling can properly accommodate modest lateral offset between the shafts.

BRIEF DESCRIPTION OF THE DRAWINGS

These and other features and advantages of the present invention will become more readily appreciated when considered in connection with the following detailed description and appended drawings, wherein.

DETAILED DESCRIPTION OF THE PREFERRED EMBODIMENT

Figure 1:
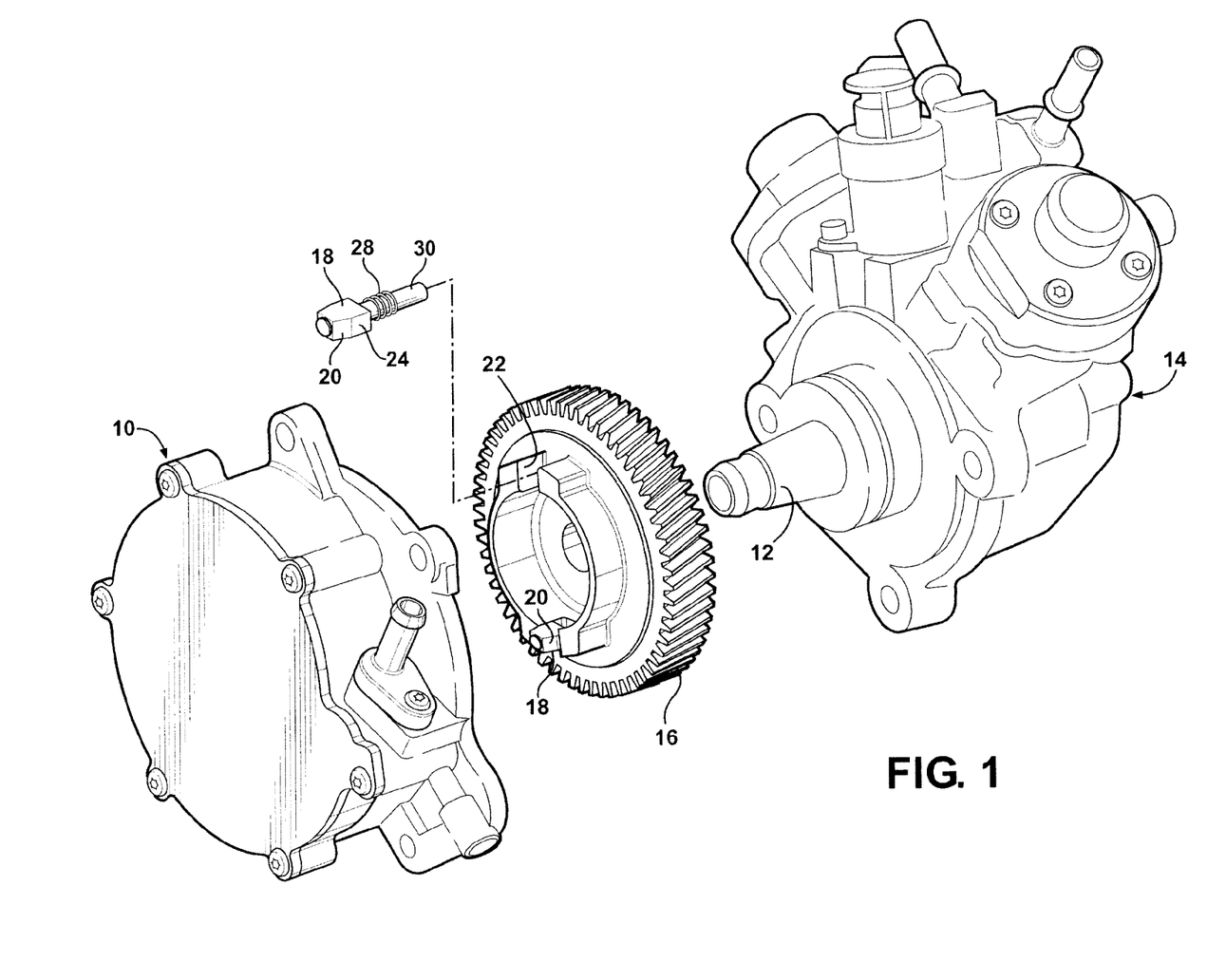
FIG. 1 is an exploded view of a vacuum pump and fuel pump assembly joined for co-rotation via a coupling device according to the subject invention.

Referring to the Figures, wherein like numerals indicate like or corresponding parts throughout the several views, a rotary input style vacuum pump is generally indicated at 10 in FIGS. 1-6. The vacuum pump 10 is used throughout this specification as an exemplary accessory device having a rotary input. As common among all accessory devices having a rotary input, the vacuum pump 10 receives its power through an operative connection to a driving shaft 12 which, in the example of FIG. 1, is rotationally supported within the structure of a fuel pump assembly, generally indicated at 14. The fuel pump 14 is presented in FIG. 1 as one possible application for the subject invention, whereas the underlying concepts of this invention are applicable to a wide variety of fields and endeavors. Continuing in this example, however, a gear 16 is affixed to the driving shaft 12 and may be driven by any type of available and convenient torque input including a meshing gear, belt, chain or other transmission device. In this example, it is assumed that the gear 16 may be in meshing contact with a cam shaft gear or timing gear (not shown). The driving shaft 12 is supported for rotation about a first axis A.

Figure 5:
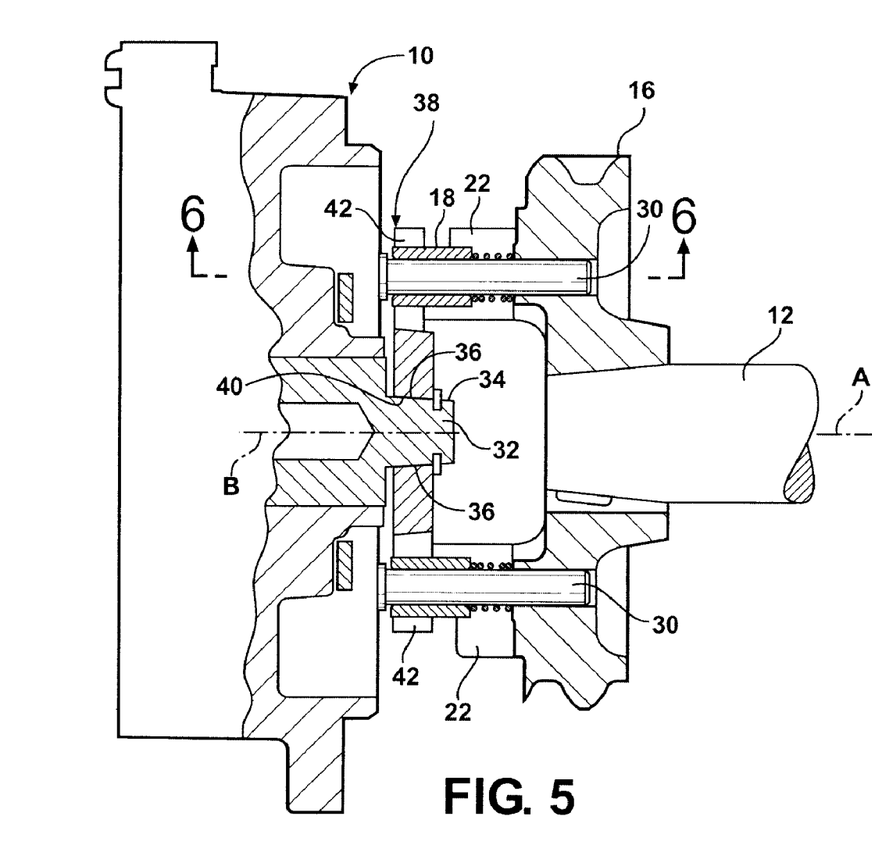
FIG. 5 is a cross-sectional view taken diametrically through the half-lugs, and as taken generally along line 5-5 in FIG. 6.

Gear 16, which is fixed onto the end of the driving shaft 12 and held there to rotate with the shaft with a feature, such as a key as suggested in FIG. 5, includes a driving lug. In the described embodiment, the driving lug is bifurcated and presented as two half lugs 18 spaced apart from each other on opposite sides of the first axis A, although those of skill in the art will envision non-bifurcated versions of a driving lug. Each half lug 18 has opposed contact faces 20 disposed generally transverse to the first axis A. The contact faces 20 are tapered in such a manner as to converge in an axial direction away from the gear 16 and the driving shaft 12. Moreover, the contact faces 20 of one half lug 18 are co-planar with the respective contact faces of the other half lug 18. Thus, the driving half lugs 18 are thickest adjacent the gear 16 and thinnest at their outer ends. In the disclosed embodiment of this invention, each half lug 18 is supported in a half guide slot 22 formed as an embossment on the gear 16, although alternative guide arrangements may be used. The half guide slots 22 are diametrically opposed from each other and equally spaced in the radial direction relative to the first axis A.

Figure 4:
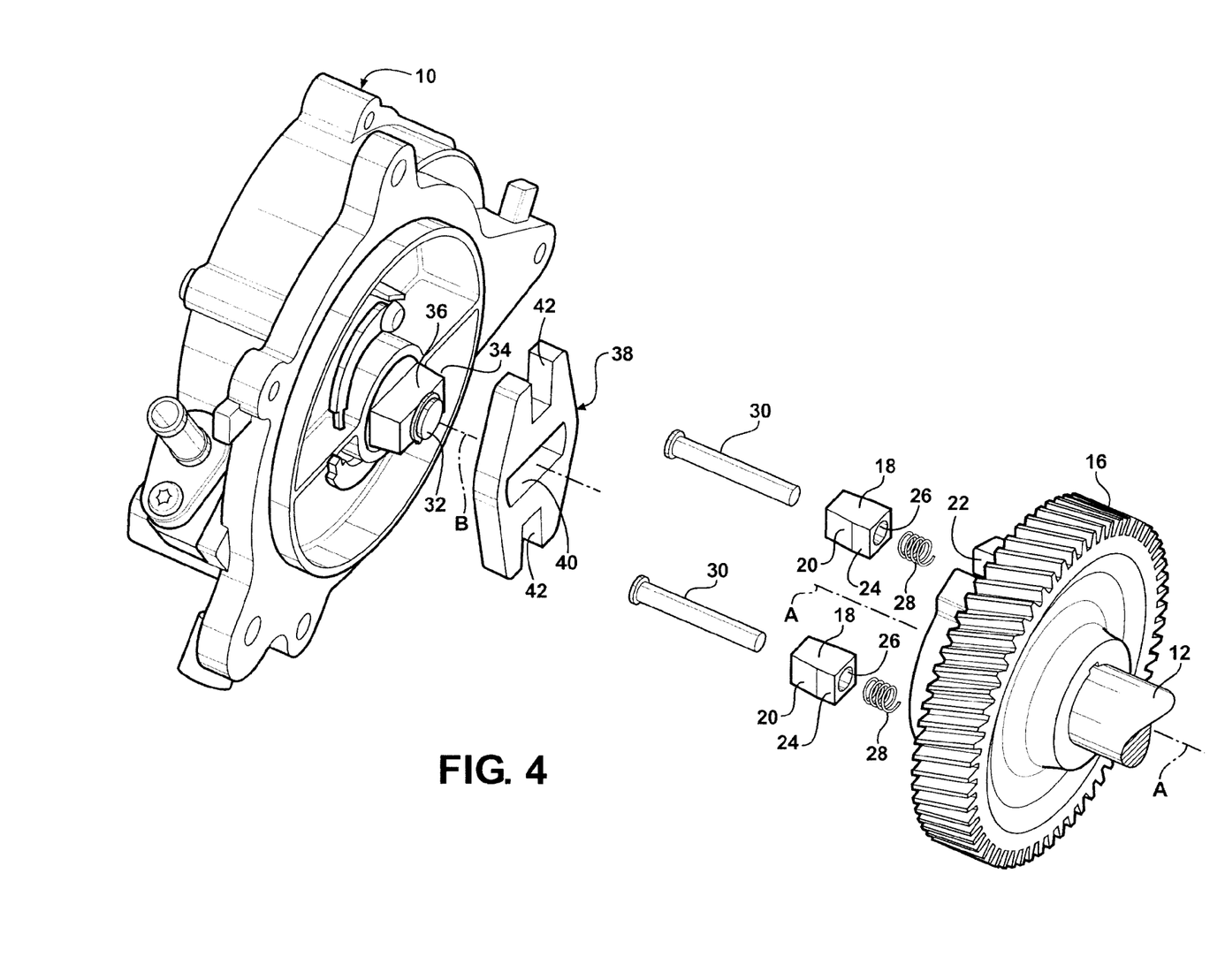
FIG. 4 is an exploded view of the components shown in FIG. 2.

Each half lug 18 includes flats 24 that are sized to fit between the guide slot faces 22 so as to hold the half lugs 18 in an axially slidable orientation and transmit rotary motion from the gear 16 to the half lugs 18. A pocket-like counter bore 26 may be formed on the backside of each half lug 18, as shown in FIG. 4, to seat a compression spring 28. An axially extending through-hole is formed in each half lug 18, centrally through the counter bore 26, to receive a pin 30 which is anchored in a hole in the gear 16. The pin 30 acts as a guide rod to permit axial sliding movement of each half lug 18 within the guide slot 22. The spring 28 thus provides a biasing force continually urging each half lug 18 toward an axially extended condition relative to the gear 16. The pin 30 is provided with a head that acts as a limit or stop so that the half lugs 18 are captured on the pin 30 and so that the flats 24 do not escape from the respective guide slots 22.

Referring again to the vacuum pump 10, this exemplary rotary device is provided with a driven shaft 32 that is supported for rotation, within the vacuum pump 10, about a second axis B. The first and second axes A, B are generally parallel to each other and preferably designed to be in col-linear alignment with each other. However, during operation and particularly in a vehicular engine environment, the axes A, B may shift occasionally due to operating stresses, moments of inertia, unequal loading, and the like, and thus become slightly misaligned while in operation. Manufacturing tolerances as well as wear of the components may also cause misalignment of the axes. The driven shaft 32 includes a driven lug 34 supported orthogonally opposite the half lugs 18. The driven lug 34 straddles the second axis B and is generally centered thereabout, but is not necessarily a unitary or non-bifurcated member. The driven lug 34 has opposed contact faces 36 disposed generally transverse to the second axis B and which converge in an axial direction away from the driven shaft 32. In other words, the driven lug 34 is thickest adjacent the vacuum pump 10. A plane located through the driven lug 34, equidistant between its contact faces 36, is oriented perpendicular to a plane located through the driving lug 18, equidistant between its contact faces 20.

Figure 3:
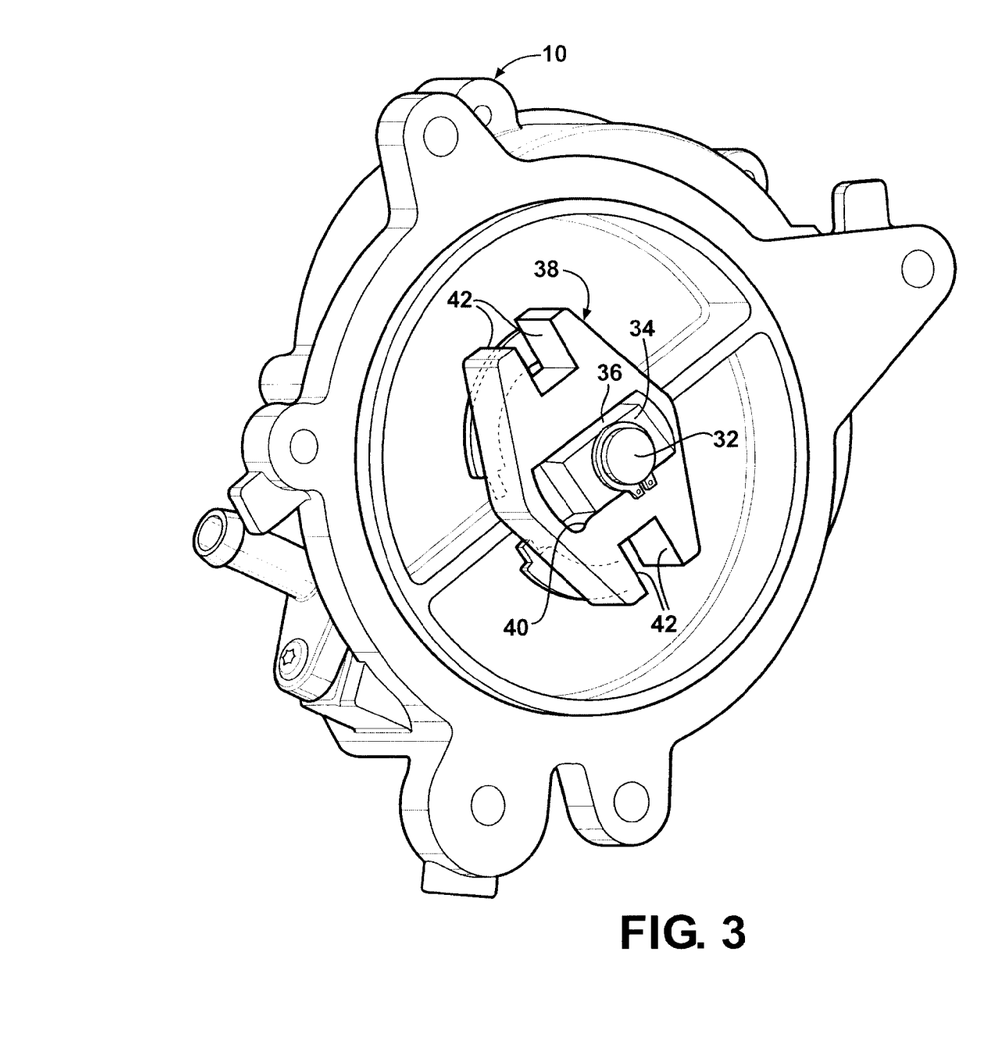
FIG. 3 is a perspective view showing the vacuum pump and its driven shaft together with a coupling plate disposed thereon.

A coupling plate, generally indicated at 38, is perhaps best shown in FIGS. 3 and 4 comprising a unitary structure adapted to interconnect the driving shaft 12 to the driven shaft 32 while accommodating moderate shaft misalignment due to the reasons mentioned above. The coupling plate 38 includes a centrally located driving slot 40 having tapering side walls corresponding to, i.e. complementing, the contact faces 36 of the driven lug 34. The driving slot 40 is longer than the length of the driven lug 34, so that the driving slot 40 can slide relative to the driven lug 34 in a transverse direction. The coupling plate 38 also includes a pair of diametrically opposed driven half slots 42 spaced apart one from each other to receive the respective half lugs 18. The half slots 42 have tapered side walls corresponding to the contact faces 20 of the half lugs 18 for slidably receiving the half lugs 18 while enabling relative sliding motion in the manner described above. In the disclosed embodiment, each half slot 42 is unbounded on its radially outer end. In other words, the half slots 42 are open at the ends, thereby giving the contact plate 38 somewhat of an H-shaped appearance when viewed from the front.

Figure 2:
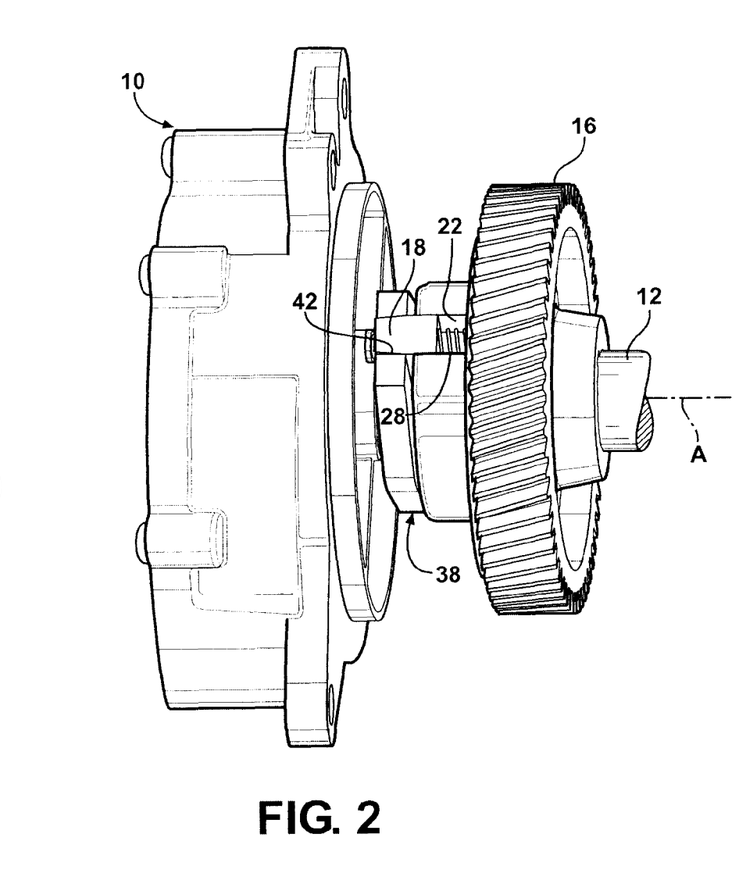
FIG. 2 is an assembled view of a vacuum pump and a driving shaft coupled to each other using the subject Oldham-style coupling.
Figure 6:
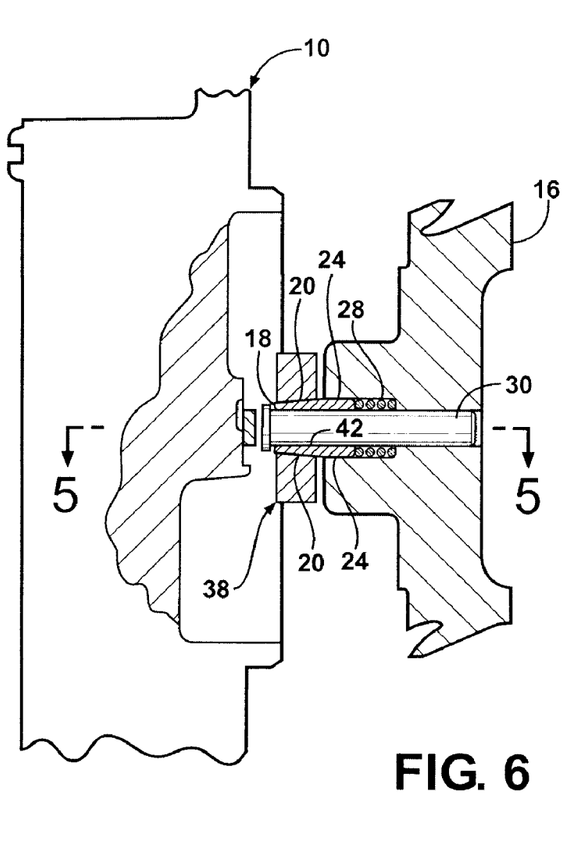
FIG. 6 is a cross-sectional view through one of the half-lugs as taken generally along line 6-6 in FIG. 5.

When the driving shaft 12 and the driven shaft 32 are brought together, as depicted in FIGS. 2, 5 and 6, the coupling plate 38 serves to transmit rotational motion therebetween while accommodating modest misalignment of the axes A and B. More specifically, the lug and coupling plate structures mimic a traditional Oldham-style coupling, such as shown in FIG. 7, to enable a generally constant velocity transmission as the motion of coupling plate 38 describes a circle whose size is dictated by the degree of instantaneous shaft misalignment. Thus, with each revolution of misaligned shafts, the driving slot 40 will slide with respect to the driven lug 34, and the half slots 42 will slide relative to their respective half lugs 18. At all times, the respective lug contact faces 20, 36 remain in full surface-to-surface engagement with the respective slots 40, 42 in the coupling plate 38, through which motion is transmitted.

In order to eliminate or substantially reduce lash in this flexible coupling assembly, the springs 28 operating against each of the half lugs 18 provide a biasing effect that establishes a continuous axial compression force between the driven 34 and driving 18 lugs and the coupling plate 38. More specifically, the springs 28 continually urge the respective half lugs 18 into tighter wedging engagement with their respective half slots 42 so as to maintain full surface-to-surface contact therebetween. The compressive force provided by the springs 28 biases the coupling plate 38 toward the vacuum pump 10, thereby more tightly seating the tapered driven lug 34 into the driving slot 40 of the coupling plate 38. Thus, through the biasing action of the springs 28, lash is removed between the mating surfaces. As the shafts 12, 32 rotate, misalignment will cause the respective slots 40, 42 to slide relative to their respective lugs 18, 34, but all the while the biasing action of the springs 28 operates to maintain full surface-to-surface contact and eliminates lash. Even as components wear due to attrition, the continual biasing force of the springs 28 dispels lash from the system.

Figure 8:
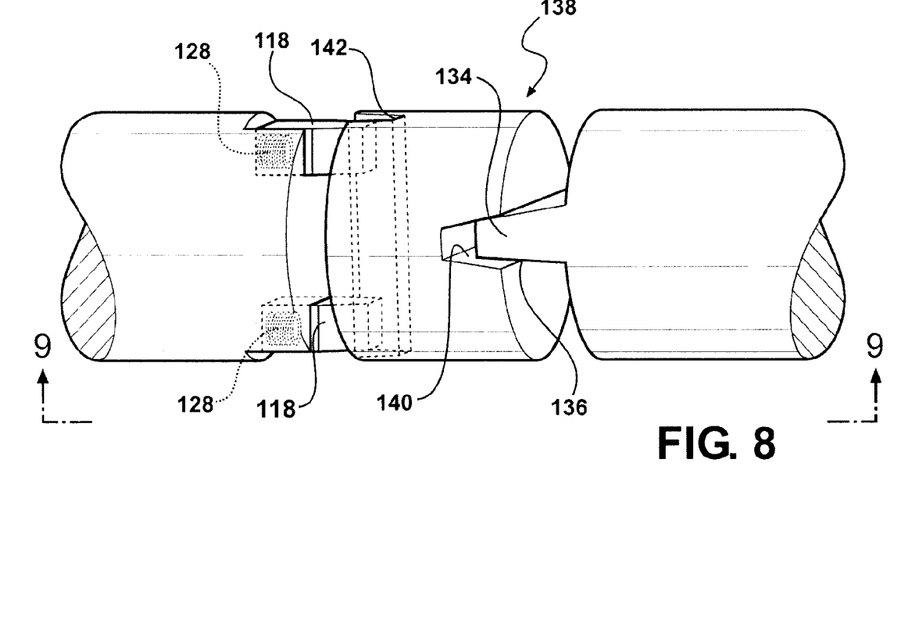
FIGS. 8 and 9 illustrate how lash can be introduced into the coupling assembly if the driving lugs and the driven lugs are not located in a common plane.

Of course, many mechanical equivalents to the disclosed coupling assembly may be envisioned by those of skill in the art. For example, the biasing element can be configured as something other than a coil spring or to act directly upon the driven lug 34 instead of the driving half lugs 18. Alternatively, the biasing element can be configured entirely within the coupling plate 38 to expand the coupling plate against the respective lugs 18, 34. This is illustrated in FIG. 8, where the coupling plate 38 is constructed from spring steel sheet metal. The coupling plate 38 is generally thin and flexible in the axial direction, yet is stiff and non-compliant in the torsional direction. Flexibility of the plate in the axial direction can be adjusted by adding flanges in certain areas. For instance, flanges may be added near the ends of the slots to reduce the flexing between pairs of slot contact faces. And further still, the particular configuration of the lugs 18, 34 can be redesigned according to any of the known forms and embodiments of Oldham-style couplings. Nonetheless, the particular configuration illustrated includes numerous advantages, including orientation of the transmitted forces in a common plane, i.e., through the body of the coupling plate 38, which reduces or eliminates couples that could force the coupling plate 38 to tilt into a position that might otherwise introduce torsional compliance or lash into the system. However, by taking up as much slack as possible in the system, impact loading is reduced that may otherwise occur with reversals of torque transmission through the mechanical system. By this method, NVH issues are improved and wear is reduced on the coupling contact faces.

The axial force generated by the springs 28 urge driving lug 18 into driven slot 42, and is resisted by a parallel force of equal magnitude between driven lug 34 and its mating slot 40. If the coupling plate 38 receives a tilting couple generated by the friction force at the driving lug 18, the spring resisting force will be biased toward one end of the driven lug 34, thereby generating a couple that opposes tilting of the coupling plate 38. Tilting of the coupling plate 38 can be avoided if certain parameters are properly controlled. The tilting couple can be minimized by keeping all the lugs in a common plane to minimize or eliminate the tilting moment arm, and also by minimizing the sliding friction force with proper lubrication and surface finish of the contact faces. The maximum magnitude of the couple that opposes tilting of the coupling plate 38 can be enhanced by maximizing length of the driven lug 34 to produce a large moment arm, and also by installing springs 28 with an adequate force preload.

Tilting of the coupling plate 38 causes backlash in the system because as the tapered driven lug 34 is withdrawn from its tapered drive slot 42, clearance between the two parts is created in the same manner that clearance between the parts disappears when they are pressed into tighter contact with each other. A conventional Oldham coupling that has its drive faces parallel to each other does not see a change in clearance between the drive and driven faces with a change in axial position, and thus does not experience the same degradation of performance with a small tilting of the coupling plate.

Accordingly, this invention provides a zero-lash, or substantially reduced lash, coupling mechanism to transmit rotational motion between two rotary shafts without introducing additional noise, vibration or harshness to the system due to the backlash. The source of backlash in prior art style Oldham couplings (FIG. 7) is found at the interfaces between the drive and driven shaft lugs and their mating coupling plate slots. However, lash is taken up in the subject invention through the action of the springs 28 as a biasing element combined with tapered contact faces 20, 36 on the respective lugs 18, 34. In one particular application of this invention, wherein a vacuum pump 10 is coupled to a fuel pump 14, further and favorable advantages can be realized by a viscous damping effect provided by the vacuum pump 10 that will help soften the torsional signature generated in a high pressure fuel injection pump 14 such as used in diesel applications.

Figure 9:
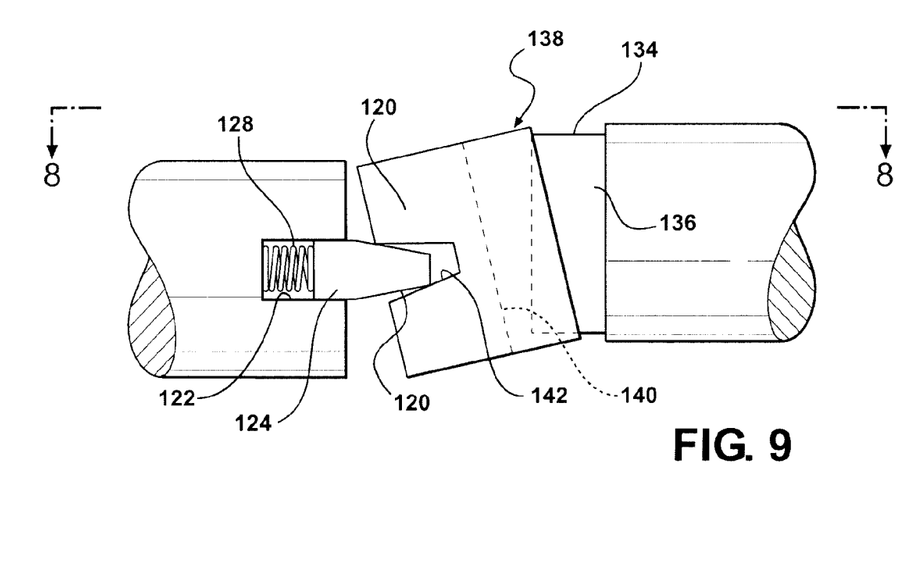

FIGS. 8 and 9 schematically illustrate an alternative undesirable embodiment of the invention in which the driving and driven lugs are axially offset from each other instead of being located in a common plane. For convenience, reference numbers introduced previously are offset by 100 to represent like or corresponding parts. In this alternative embodiment, a couple applied to the coupling plate 138 introduces torsional backlash into the system. If the driven axis B is misaligned with the driving axis A, the sliding friction of driven lug 134 within the driven slot 140 produces a force that is opposed by an equal and opposite resisting force at the interface between the driving lug 118 and its mating driven slot 142. If the contact faces 136 of the driven lug 134 are not in the same plane as the contact faces 120 of the driving lug 118, the axial spacing between the contact faces 136, 120 create a moment arm that when multiplied by the magnitude of the friction force between driven lug 134 and its mating driving slot 140 produces a couple that tends to tilt the axis of the coupling plate 138. If the coupling plate 138 tilts relative to axis A, the contact face 136 of the driven lug 134 will no longer have full surface-to-surface contact and torsional backlash will be introduced.

Figure 10:
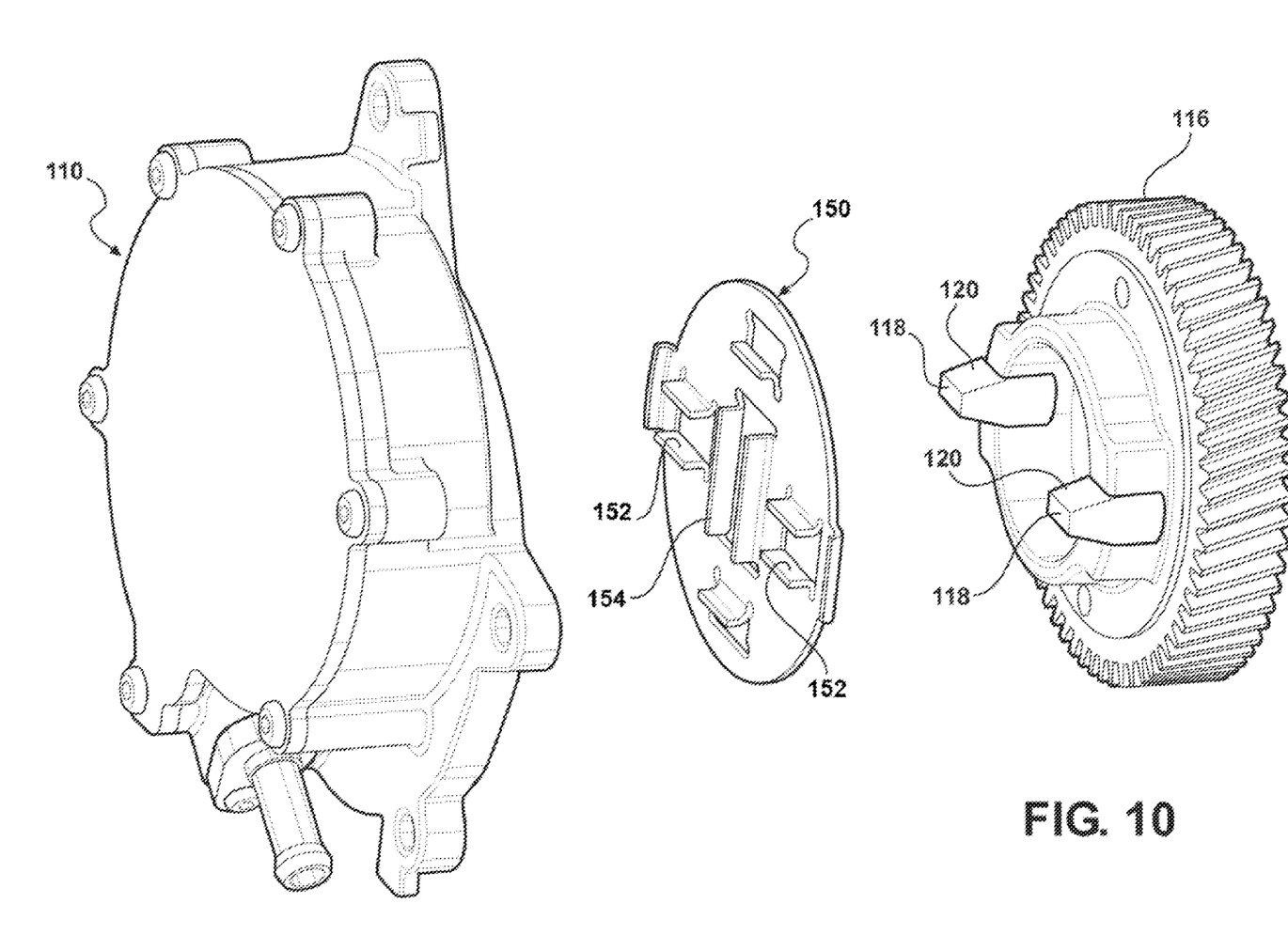
FIG. 10 schematically illustrates an alternative configuration of the invention where the coupling plate is constructed with appropriate elasticity to generate an axial biasing force, negating the need for separate spring elements.
Figure 11:
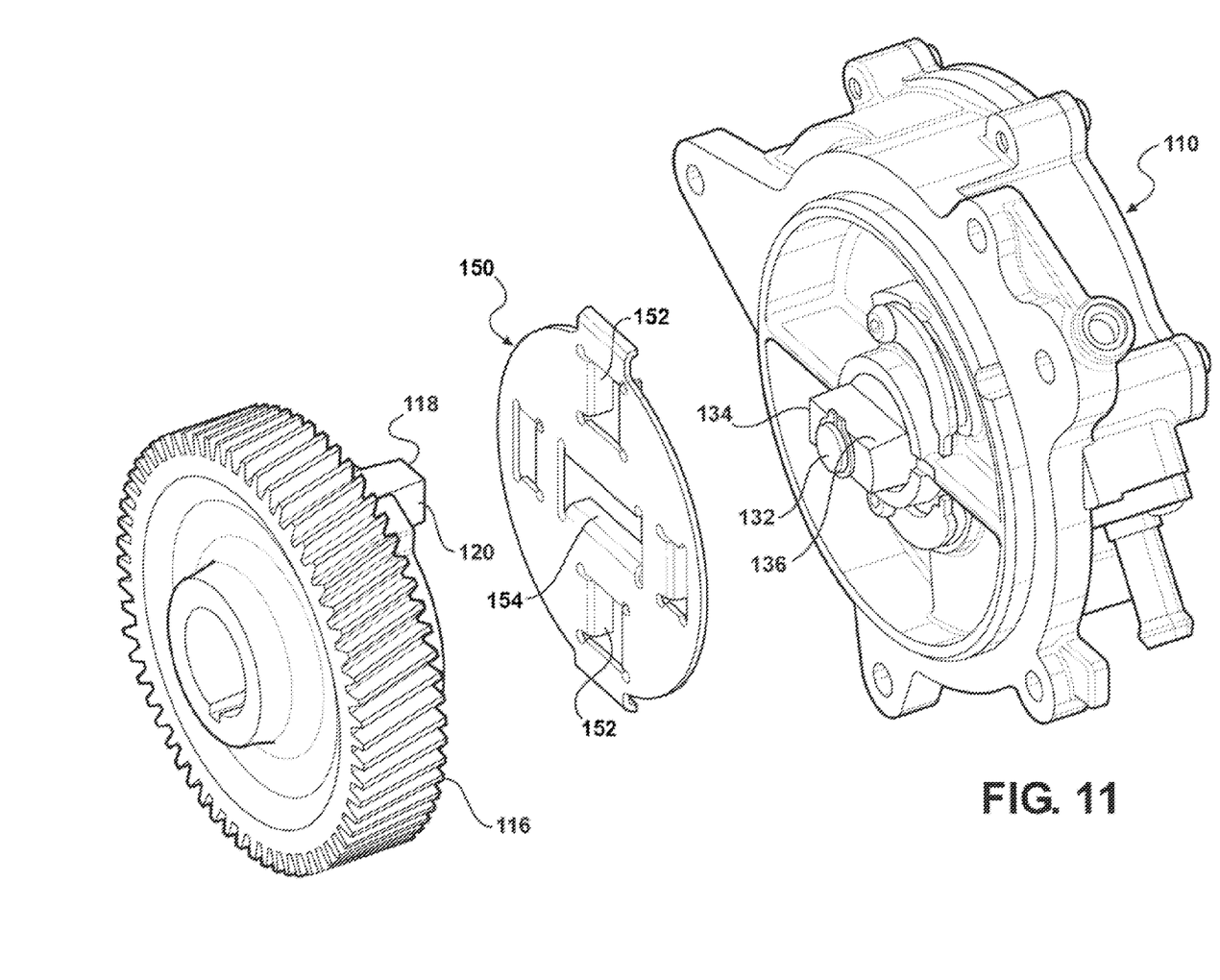
FIG. 11 is a view as in FIG. 10 but showing a different perspective.

FIGS. 10 and 11 depict an alternate embodiment, wherein the coupling plate 150 is formed as unitary sheet-like member such as can be formed in an inexpensive stamping operation which also includes forming slots 152 and 154. Of course, the unitary sheet-like nature of this alternative coupling plate 150 can be implemented within the context of the first disclosed embodiment of this invention in FIGS. 1-8, wherein springs 28 provide a biasing force as described.

The foregoing invention has been described in accordance with the relevant legal standards, thus the description is exemplary rather than limiting in nature. Variations and modifications to the disclosed embodiment may become apparent to those skilled in the art and fall within the scope of the invention. Accordingly the scope of legal protection afforded this invention can only be determined by studying the following claims.

What is claimed is:

1. An Oldham-style coupling assembly for transmitting rotational motion between two rotary shafts, said coupling assembly comprising:
    a driving shaft supported for rotation about a first axis, said driving shaft including a driving lug having opposed contact faces disposed generally orthogonal to said first axis, said contact faces tapered in a converging axial direction away from said driving shaft;
    a driven shaft supported for rotation about a second axis generally collinear with said first axis, said driven shaft including a driven lug supported opposite said driving lug, said driven lug having opposed contact faces disposed generally transverse to said second axis and tapered in a converging axial direction away from said driven shaft, and with one of said driven and driving lugs being bifurcated into half-lugs spaced apart one from another on opposite sides of the respective said first and second axis;
    a coupling plate operatively disposed between said driving and driven shafts, said coupling plate including a driving slot having tapered side walls corresponding to said contact faces of said driven lug for engaging said driven lug while enabling transverse relative sliding motion therebetween, and a driven slot having tapered side walls corresponding to said contact faces of said driving lug for engaging said driving lug while enabling transverse relative sliding motion therebetween; and
    a biasing element configured to establish a continuous axial compression force between each of said driven and driving lugs and said coupling plate, said biasing element disposed between one of said driven and driving lugs and said respective driven and driving shafts.

2. The assembly of claim 1, wherein said biasing element includes a spring directly engaging each of said half-lugs.

3. The assembly of claim 2, wherein each said half-lug includes a counterbore for receiving said respective spring.

4. The assembly of claim 2, wherein each said half-lug is supported in a guide slot.

5. The assembly of claim 4, wherein each said half-lug and said respective spring is supported on a pin.

6. A coupling assembly for transmitting rotational motion between a driven shaft of a vacuum pump and a driving shaft associated with a fuel pump while accommodating shaft misalignment therebetween, said coupling assembly comprising:
    a driving shaft supported for rotation within a fuel pump about a first axis, said driving shaft including a pair of bifurcated output half-lugs spaced apart one from each other on opposite sides of said first axis, each of said half-lugs having opposed contact faces disposed generally transverse to said first axis, said contact faces converging in an axial direction away from said driving shaft;
    a driven shaft supported for rotation within a vacuum pump about a second axis generally collinear with said first axis, said driven shaft including a driven lug supported opposite said half-lugs, said driven lug having opposed contact faces disposed generally transverse to said second axis and converging in an axial direction away from said driven shaft;
    a coupling plate operatively disposed between said driving and driven shafts, said coupling plate including a driving slot having tapered side walls corresponding to said contact faces of said driven lug for engaging said driven lug while enabling relative sliding motion therebetween, and a pair of driven half-slots spaced apart one from each other to receive the respective said half-lugs, said half-slots each having tapered side walls corresponding to said contact faces of said driving half-lugs for slideably receiving said respective half-lugs while enabling relative sliding motion; and
    a biasing element disposed between each of said half-lugs and said driving shaft to establish a continuous axial compression between said half-lugs and said coupling plate and also between said coupling plate and said driven lug wherein said biasing element includes a spring directly engaging each of said half-lugs.

7. The assembly of claim 6, wherein each said half-lug includes a counterbore for receiving said respective spring.

8. The assembly of claim 6, wherein each said half-lug is supported in a guide slot.

9. The assembly of claim 6, wherein each said half-lug and said respective spring is supported on a pin.

10. The assembly of claim 6, wherein said half-slots are each unbounded on a radially outer end thereof.

11. A method for coupling two rotary members having respective driven and driving shafts in close proximity while accommodating modest shaft misalignment therebetween, said method comprising the steps of:
    rotatably supporting a driving shaft about a first axis;
    providing a driving lug on the driving shaft having tapered contact faces;
    rotatably supporting a driven shaft about a second axis;
    providing a driven lug on the driven shaft having tapered contact faces;
    providing an intermediate coupling plate between the driving and driven shafts having a driving slot with tapered side walls corresponding to the contact faces of the driven lug and a driven slot oriented transversely to the driving slot, the driven slot having tapered side walls corresponding to the contact faces of the driving lug;
    slideably engaging the driven lug in the driving slot;
    slideably engaging the driving lug in the driven slot;
    and maintaining an axial compression between the driven and driving lugs and the intermediate coupling plate by displacing one of the driven and driving lugs relative to its respective driven and driving shaft.

12. The method of claim 11, wherein said displacing step includes guiding the one driven and driving lug in an axial direction within a guide slot formed in its respective driven and driving shaft.

13. The method of claim 11, wherein said rotatably supporting a driving shaft includes supporting the driving shaft within a fuel pump, and said rotatably supporting a driven shaft includes supporting the driven shaft within a vacuum pump.

* * * * *